(12) United States Patent
Hart et al.

(10) Patent No.: US 7,378,174 B2
(45) Date of Patent: *May 27, 2008

(54) FUEL CELL MODULE

(75) Inventors: Nigel T. Hart, Derby (GB); Gary J. Wright, Derby (GB); Gerard D. Agnew, Derby (GB)

(73) Assignee: Rolls-Royce plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/897,105

(22) Filed: Jul. 23, 2004

(65) Prior Publication Data

US 2005/0008917 A1 Jan. 13, 2005

Related U.S. Application Data

(63) Continuation of application No. PCT/GB03/00268, filed on Jan. 24, 2003.

(30) Foreign Application Priority Data

Jan. 24, 2003 (GB) .................................. 0201796

(51) Int. Cl.
*H01M 8/10* (2006.01)

(52) U.S. Cl. ....................................................... 429/32

(58) Field of Classification Search ............ 429/12–39; 29/623.1
See application file for complete search history.

(56) References Cited

U.S. PATENT DOCUMENTS 5,169,731 A * 12/1992 Yoshimura et al. ............ 429/30

6,190,796 B1 * 2/2001 Chalasani et al. .......... 429/100
2004/0028975 A1 * 2/2004 Badding et al. .............. 429/32

FOREIGN PATENT DOCUMENTS

| DE | 4 213 728 A | 5/1983 |
|---|---|---|
| EP | 0 452 737 A | 10/1991 |
| JP | 2001 273914 A | 10/2001 |

* cited by examiner

*Primary Examiner*—Mark Ruthkosky
*Assistant Examiner*—Keith Walker
(74) *Attorney, Agent, or Firm*—W. Warren Taltavull; Manelli Denison & Selter PLLC

(57) ABSTRACT

A solid oxide fuel cell module comprises a hollow support member and a plurality of fuel cells spaced apart longitudinally on one surface of the hollow support member. A plurality of interconnectors electrically connect the fuel cells in electrical series. Each fuel cell comprises a first electrode, an electrolyte and a second electrode. The first electrode of each of the fuel cells are electrically connected to the second electrode of adjacent fuel cells by a plurality of interconnectors spaced apart laterally with respect to the hollow support member. A laterally extending end of the first electrode of the said adjacent fuel cell has a plurality of recesses spaced apart laterally with respect to the hollow support member. Each of the interconnectors is positioned in a respective one of the plurality of recesses in the laterally extending end of the first electrode of the said adjacent fuel cell.

11 Claims, 2 Drawing Sheets

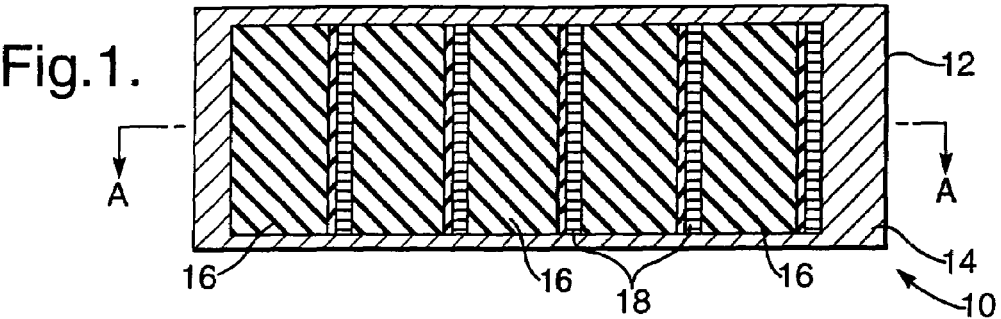
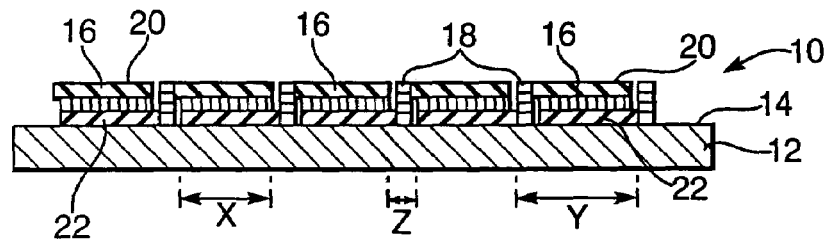
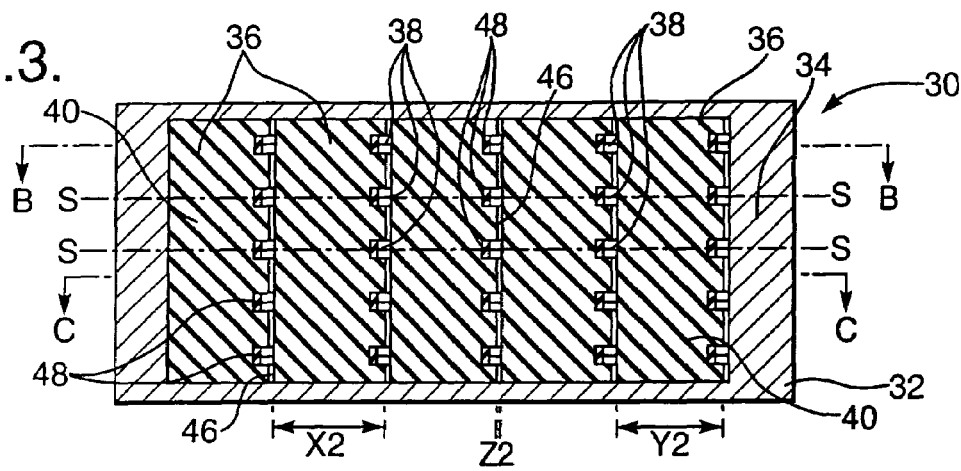
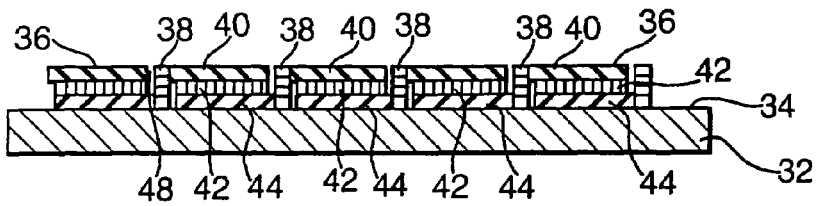
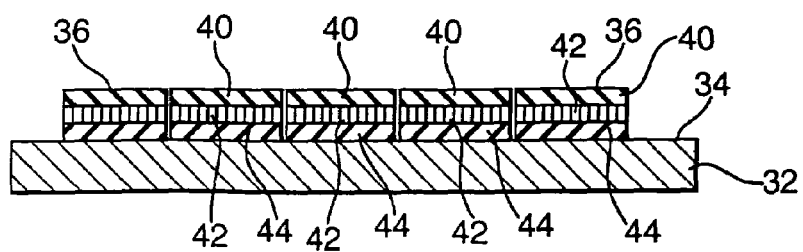

FUEL CELL MODULE

This is a Continuation of International Appln. No. PCT/GB2003/00268 filed Jan. 24, 2003 designated the U.S.

FIELD OF THE INVENTION

The present invention relates to a fuel cell module and in particular to a solid oxide fuel cell module.

BACKGROUND OF THE INVENTION

Solid oxide fuel cell modules comprising a plurality of solid oxide fuel cells connected in electrical series are known.

In our European patent EP0668622A1 a solid oxide fuel cell module comprises a plurality of solid oxide fuel cells arranged on the flat surfaces of a hollow support member. The solid oxide fuel cells extend laterally across the full lateral extent of the surfaces of the hollow support member and the solid oxide fuel cells are spaced apart longitudinally on the surfaces of the hollow support member. The adjacent solid oxide fuel cells are connected electrically in series by an interconnector. Each interconnector extends laterally across the full lateral extent of the surface of the hollow support member to electrically connect an anode electrode of one solid oxide fuel cell with the cathode electrode of an adjacent solid oxide fuel cell.

The main parameters of the solid oxide fuel module are the fuel cell active length, the fuel cell pitch and the fuel cell gap. The fuel cell active length is the length of the solid oxide fuel cell longitudinally along the hollow support member. The fuel cell gap is the distance between adjacent solid oxide fuel cells. The fuel cell pitch is the sum of the fuel cell active length and the fuel cell gap.

The fuel cell active length and the fuel cell pitch are selected to optimise performance of the solid oxide fuel cell module. The fuel cell gap should be as small as possible to maximise the fuel cell length as a proportion of the fuel cell pitch. However, the fuel cell gap is dictated by the need for an interconnector to electrically connect the adjacent solid oxide fuel cells in series and to provide a space between the interconnector and the electrodes of the adjacent solid oxide fuel cells. The fuel cell gap may be reduced by reducing the length of the interconnector and the spaces. However, this makes it difficult to accurately align the interconnectors and the electrodes to avoid electrical failure of the fuel cell structure. Thus the minimum size of the fuel cell gap is restricted by this requirement and hence the fuel cell active length as a proportion of the fuel cell pitch is not maximised.

SUMMARY OF THE INVENTION

Accordingly the present invention seeks to provide a novel fuel cell stack, which reduces, preferably overcomes, the above-mentioned problems.

Accordingly the present invention provides a solid oxide fuel cell module comprising a plurality of longitudinally spaced apart solid oxide fuel cells, a plurality of interconnectors to electrically connect the fuel cells in electrical series, each fuel cell comprising a first electrode, an electrode and a second electrode, the first electrode of at least one of the fuel cells being electrically connected to the second electrode of an adjacent fuel cell by a plurality of laterally spaced apart interconnectors, a laterally extending end of the first electrode of the said adjacent fuel cell having a plurality of laterally spaced apart recesses, each of the interconnectors connecting the first electrode of the said at least one fuel cell to the second electrode of the said adjacent fuel cell being positioned in a respective one of the plurality of recesses in the laterally extending end of the first electrode of the said adjacent fuel cell.

Preferably the first electrodes of each one of a plurality of the fuel cells being electrically connected to the second electrode of each one of a plurality of adjacent fuel cells by a plurality of laterally spaced apart interconnectors, a laterally extending end of each of the first electrodes of the said adjacent fuel cells having a plurality of laterally spaced cart recesses, each of the interconnectors connecting the first electrode of each of the fuel cells to the second electrode of the said adjacent fuel cells being positioned in a respective one of the recesses in the laterally extending end of the first electrode of the said adjacent fuel cell.

The fuel cell module may comprise a support member, the fuel cells being spaced apart longitudinally on at least one surface of the support member, and the interconnectors being spaced apart laterally with respect to the support member. The support member may be a hollow support member.

Preferably the second electrodes are arranged on the support member, the electrolytes are arranged on the second electrodes and the first electrodes are arranged on the electrolytes.

Preferably the second electrodes are anode electrodes and the first electrodes are cathode electrodes.

The electrolyte may extend continuously through all of the fuel cells and each interconnector is formed as a part of the electrolyte.

The interconnectors connecting the first electrodes of the fuel cells to the second electrodes of the adjacent fuel cells being arranged in a plurality of parallel planes extending longitudinally with respect to the support member.

The interconnectors connecting two adjacent fuel cells may be arranged in the same planes as the interconnectors connecting another two adjacent fuel cells. Alternatively the interconnectors connecting two adjacent fuel cells may be arranged in different planes to the interconnectors connecting another two adjacent fuel cells.

The interconnectors may be equi-spaced laterally with respect to the support member and the recesses may be equi-spaced laterally with respect to the support member. The support member may be a hollow support member.

BRIEF DESCRIPTION OF THE DRAWINGS

The present invention will be more fully described by way of example with reference to the accompanying drawings in which:

FIG. 1 is a schematic plan view of a prior art fuel cell module.

FIG. 2 is a schematic cross-sectional view along line A-A in FIG. 1.

FIG. 3 is a schematic plan view of a fuel cell module according to the present invention.

FIG. 4 is a schematic cross-sectional view along line B-B in FIG. 3.

FIG. 5 is a schematic cross-sectional view along line C-C in FIG. 3.

DETAILED DESCRIPTION OF THE INVENTION

Figure 6:
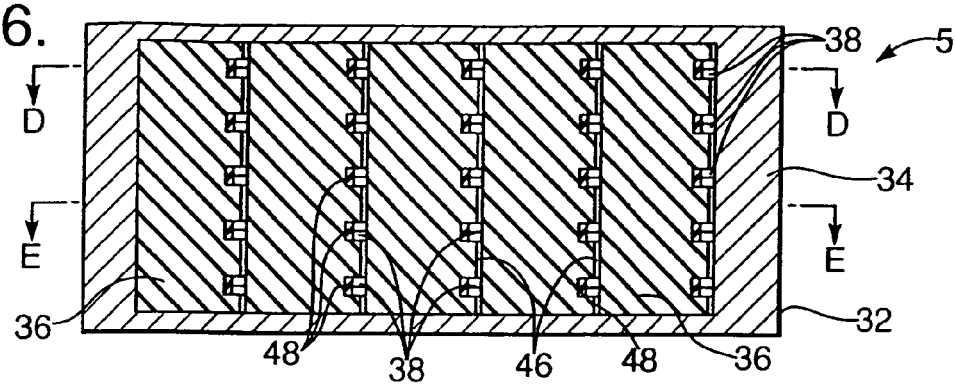
FIG. 6 is a schematic plan view of another fuel cell module according to the present invention.

A prior art solid oxide fuel cell module 10, as shown in FIGS. 1 and 2, comprises a plurality of solid oxide fuel cells 16 arranged on the flat surfaces 14 of a hollow support member 12. The solid oxide fuel cells 16 extend laterally across the full lateral extent or the surfaces 14 of the hollow support member 12 and the solid oxide fuel cells 16 are spaced apart longitudinally on the surfaces 14 of the hollow support member 12. The adjacent solid oxide fuel cells 16 are connected electrically in series by interconnectors 18. Each interconnector 18 extends laterally across the full lateral extent of the surface 14 of the hollow support member 12 to electrically connect an anode electrode 22 of one solid oxide fuel cell 16 with the cathode electrode 20 of an adjacent solid oxide fuel cell 16.

The main parameters of the solid oxide fuel cell module 10 are the fuel cell active length X, the fuel cell pitch Y and the fuel cell gap Z. The fuel cell active length X is the length of the solid oxide fuel cell 16 longitudinally along the hollow support member 12. The fuel cell gap Z is the distance between adjacent solid oxide fuel cells 16. The fuel cell pitch Y is the sum of the fuel cell active length X and the fuel cell gap Z.

As discussed earlier the fuel cell active length X and the fuel cell pitch Y are selected to optimise performance of the solid oxide fuel cell module 10. The fuel cell gap Z should be as small as possible to maximise the fuel cell length X as a proportion of the fuel cell pitch Y. However, the fuel cell gap Z is dictated by the need for an interconnector 18 to electrically connect the adjacent solid oxide fuel cells 16 in series and to provide a space between the interconnector 18 and the electrodes 20, 22 of the adjacent solid oxide fuel cells 16. The fuel cell gap Z may be reduced by reducing the length of the interconnector 18 and the spaces. However, this makes it difficult to accurately align the interconnectors 18 and the electrodes 20, 22 to avoid electrical failure of the fuel cell structure 16. Thus the minimum size of the fuel cell gap Z is restricted by this requirement and hence the fuel cell active length X as a proportion of the fuel cell pitch Y is not maximised.

A solid oxide fuel cell module 30 according to the present invention is shown in FIGS. 3 to 5. The solid oxide fuel cell module 30 comprises a hollow support member 32 and a plurality of solid oxide fuel cells 36 spaced apart longitudinally on at least one surface 34 of the hollow support member 32. A plurality of interconnectors 38 electrically connect the solid oxide fuel cells 36 in electrical series. Each solid oxide fuel cell 36 comprises a first electrode 40, an electrolyte 42 and a second electrode 44. In this example the first electrode 40 is the cathode electrode and the second electrode 44 is the anode electrode.

Each of the first electrodes 40 of all but one of the solid oxide fuel cells 36 is electrically connected to the second electrode 44 of a respective adjacent solid oxide fuel cell 36 by a plurality of interconnectors 38. The plurality of interconnectors 38 electrically connecting the first electrode 40 of one solid oxide fuel cell 36 to the second electrode 44 of an adjacent solid oxide fuel cell 36 are spaced apart laterally with respect to the hollow support member 32.

A laterally extending end 46 of the firs electrode 40 of each of the said adjacent solid oxide fuel cell 36 has a plurality of recesses 48 spaced apart laterally with respect to the hollow support member 32. Each of the interconnectors 38 electrically connecting the first electrode 40 of the said solid oxide fuel cell 36 to the second electrode 44 of the said adjacent solid oxide fuel cell 36 is positioned in a respective one of the plurality of recesses 48 in the laterally extending end 46 of the first electrode 40 of the said adjacent solid oxide fuel cell 36.

It is to be noted that the second electrodes 44 are arranged on the surface 34 of the hollow support member 32, the electrolytes 42 are arranged on the second electrodes 44 and the first electrodes 40 are arranged on the electrolytes 42.

The interconnectors 38 connecting the first electrodes 40 of the solid oxide fuel cells 36 to the second electrodes 44 of the adjacent solid oxide fuel cells 36 are arranged in a plurality of parallel planes extending longitudinally with respect to the hollow support member 32 as indicated by planes S in FIG. 3. The interconnectors 38 connecting two adjacent solid oxide fuel cells 36 are arranged in the same planes S as the interconnectors 38 connecting another two adjacent solid oxide fuel cells 36.

It is to be noted from FIG. 3 that the effective fuel cell gap $Z_2$ has been reduced by providing the plurality of laterally spaced interconnectors 38 and by providing the recesses 48 in the laterally extending edge 46 of the first electrodes 36. Thus the size of the fuel cell gap $Z_2$ has been minimised and hence the fuel cell active length $X_2$ as a proportion of the fuel cell pitch $Y_2$ is maximised.

Thus the plurality of laterally spaced interconnectors 38 and the plurality of recesses 48 in the laterally extending edge 46 of the first electrodes 36 of the solid oxide fuel cells 36 has increased the active length of the solid oxide fuel cells 36 between the planes containing the interconnectors 38 and recesses 48. But the active length of the solid oxide fuel cells 36 in the planes containing the interconnectors 38 and recesses 48 remains the same.

Figure 7:
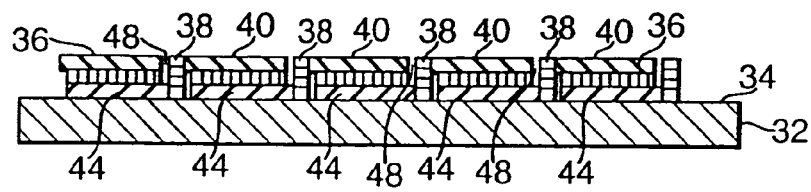
FIG. 7 is a schematic cross-sectional view along line D-D in FIG. 6.
Figure 8:
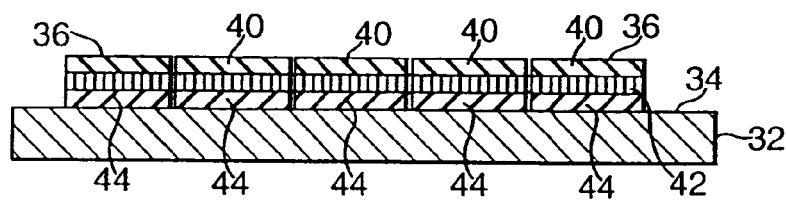
FIG. 8 is a schematic cross-sectional view along line E-E in FIG. 6.

A further solid oxide fuel cell module 50 according to the present invention is shown in FIGS. 6 to 8. The arrangement in FIGS. 6 to 8 is substantially the same as that shown in FIGS. 3 to 5 and like parts are denoted by like numerals. The embodiment in FIGS. 6 to 8 differs in that the electrolyte 42 extends continuously through all of the solid oxide fuel cells 36 and each interconnector 38 is formed as a part of the electrolyte 42. The electrolyte 42 extending continuously through the solid oxide fuel cells 36 will produce an ionic current path between the solid oxide fuel cells 36, but it is believed that because the electrolyte 42 is a relatively thin layer, about 20 micrometers, that the geometry will lead to a relatively high electrical resistance.

Figure 9:
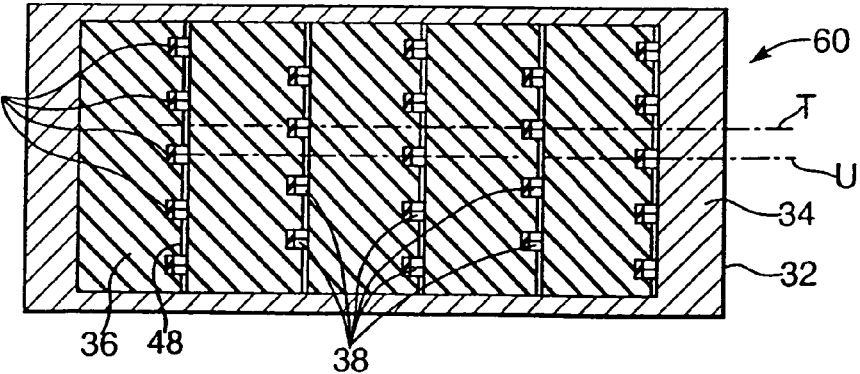
FIG. 9 is a schematic plan view of a further fuel cell module according to the present invention.

A further solid oxide fuel cell module 60 according to the present invention is shown in FIG. 9. The arrangement in FIG. 9 is substantially the same as that shown in FIGS. 3 to 5 and like parts are denoted by like numerals. The embodiment in FIG. 9 differs in that the interconnectors 38 connecting two adjacent solid oxide fuel cells 36 are arranged in a first set of planes T and the interconnectors 38 connecting another two adjacent solid oxide fuel cells 36 are arranged in a second set of planes U. The planes T and U are arranged alternately and are equi-spaced apart laterally of the hollow support member 32.

The interconnectors 38 are equally spaced laterally with respect to the hollow support member 30 and the recesses 48 are equally spaced laterally with respect to the hollow support member 30 in FIGS. 3 to 9. However, it may be possible to have the interconnectors 38 unequally spaced laterally with respect to the hollow support member 30 and the recesses 48 unequally spaced laterally with respect to the hollow support member 30.

The solid oxide fuel cells 36 are manufactured by screen-printing of the layers of electrodes, electrolytes, interconnectors etc.

Figure 10:
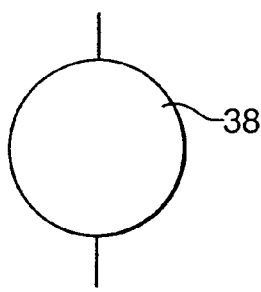
FIGS. 10 and 11 are alternative enlarged cross-sectional views through interconnector shown in FIGS. 3 to 9.
Figure 11:
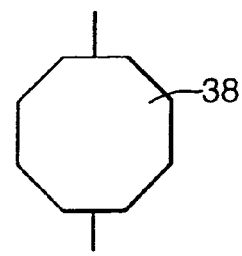

The interconnectors 38 may be circular in cross-section or octagonal in cross-section as shown in FIGS. 10 and 11 respectively. However, other suitable shapes may be used. The octagonal shaped interconnectors 38 are suitable for manufacture using the screen-printing techniques.

The present invention also allows fuel cell pitch $Y_2$ to be reduced significantly, allowing a higher number of solid oxide fuel cells 36 to be provided on the surface 34 of the hollow support member 32.

The present invention has two main advantages. Firstly, there is an increase in the active area of the solid oxide fuel cells for a given area of solid oxide fuel cell pattern, which results in an increase in power for a given length of hollow support member. This also improves the relative magnitude of the actual activation resistance and ohmic resistance for each of the solid oxide fuel cells. Secondly, it is possible to increase the number of solid oxide fuel cells for a given length of hollow support member. This makes it possible to fabricate a solid oxide fuel cell module with a higher number of solid oxide fuel cells, producing power at a high voltage. This results in a lower cell current drawn through the solid oxide fuel cell structure and substantially reduces the level of lateral conductivity required in the electrodes. This allows a reduction in the amount of materials used, and hence the costs, to manufacture the solid oxide fuel cells.

The present invention has been described by way of reference to simple schematic representations of a solid oxide fuel cell module. In practice each of the first electrode, second electrode and electrolyte of each solid oxide fuel cell may comprise one or more layers tailored for particular properties. Seals may be provided to prevent leakage of reactants from the first electrode and second electrode of the solid oxide fuel cells. The present invention is applicable to these practical solid oxide fuel cell modules.

The invention claimed is:

1. A solid oxide fuel cell module comprising a plurality of longitudinally spaced apart solid oxide fuel cells, a plurality of interconnectors to electrically connect the fuel cells in electrical series, each fuel cell comprising a first electrode having a first and a second laterally extending end, an electrolyte and a second electrode having a first and second laterally extending end, the first electrode of at least one of the fuel cells being electrically connected to the second electrode of an adjacent fuel cell wherein the at least one of the fuel cells being electrically connected to the second electrode of an adjacent fuel cell by a plurality of laterally spaced apart interconnectors, said first electrode having an edge and said interconnectors being spaced apart laterally on said edge, and connecting said first electrode of the said at least one of the fuel cells to the second electrode of the said adjacent fuel cell, each of the laterally spaced interconnectors of the first electrode of the at least one of the fuel cells being positioned in a respective one of the plurality of laterally spaced recesses in the laterally extending second end of the first electrode of the said adjacent fuel cell wherein each said laterally spaced recess is defined by three members where said interconnector comprises a first member, said second electrode comprises a second member and said electrolyte together with said first electrode comprises a third member.

2. A solid oxide fuel cell module as claimed in claim 1 wherein the fuel cell module comprises a support member, the fuel cells being spaced apart longitudinally on at least one surface of the support member and the interconnectors being spaced apart laterally with respect to the support member.

3. A solid oxide fuel cell module as claimed in claim 2 wherein the second electrodes are arranged on the support member, the electrolytes are arranged on the second electrodes and the first electrodes are arranged on the electrolytes.

4. A solid oxide fuel cell module as claimed in claim 3 wherein the support member is a hollow support member.

5. A solid oxide fuel cell module as claimed in claim 1, wherein the second electrodes are anode electrodes and the first electrodes are cathode electrodes.

6. A solid oxide fuel cell module as claimed in claim 1 wherein the electrolyte extends continuously through all of the fuel cells and each interconnector is formed as a part of the electrolyte.

7. A solid oxide fuel cell module as claimed in claim 1 wherein the interconnectors connecting the first electrodes of the fuel cells to the second electrodes of the adjacent fuel cells being arranged in a plurality of parallel planes extending longitudinally.

8. A solid oxide fuel cell module as claimed in claim 7 wherein the interconnectors connecting two adjacent fuel cells being arranged in the same planes as the interconnectors connecting another two adjacent fuel cells.

9. A solid oxide fuel cell module as claimed in claim 7 wherein the interconnectors connecting two adjacent fuel cells being arranged in different planes to the interconnectors connecting another two adjacent fuel cells.

10. A solid oxide fuel cell module as claimed in claim 1 wherein the interconnectors being equi-spaced laterally and the recesses being equi-spaced laterally.

11. A solid oxide fuel cell as claimed in claim 7 wherein the active length of the solid oxide fuel cells between planes containing the interconnectors and recesses is longer than the active length of the solid oxide fuel cells in the planes containing the interconnectors and recesses.

* * * * *